United States Patent Office 2,984,686
Patented May 16, 1961

2,984,686
6-DEOXY-6-DEMETHYL-6-METHYLENE-5-OXYTETRACYCLINES

Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Filed Dec. 19, 1960, Ser. No. 76,441
12 Claims. (Cl. 260—559)

This invention relates to new and useful antibacterial agents of the tetracycline type, salts thereof and processes for their production as well as intermediates useful therefor.

The final products of this invention are new and useful tetracycline compounds of the following formula:

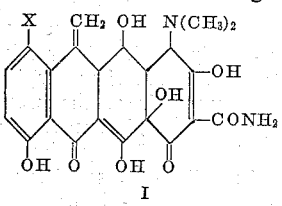

in which:

X is selected from the group consisting of hydrogen, chloro, iodo and bromo.

The present new compounds are hereinafter referred to as 6-deoxy-6-demethyl-6-methylene-5-oxytetracyclines for convenience. These new compounds are useful by virtue of their high antibacterial activity both in vivo and in vitro.

The present new compounds are prepared according to the following reaction sequence:

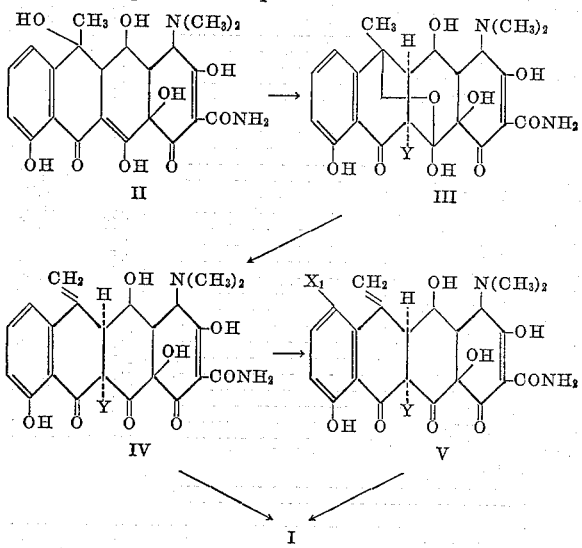

In the above sequence of reactions, X is as previously described; Y is halogen, preferably fluoro and chloro; and $X_1$ is chloro, bromo or iodo. This sequence of reactions may be summarized as follows:

II→III, 11a-halogenation to produce 11a-halo-5-oxytetracyclines in which the halogen is cis to the hydrogen in the 5a-position;

III→IV, treatment with a strong acid;
IV→V, direct halogenation;
$\left.\begin{array}{c}\text{IV}\\\text{V}\end{array}\right\} \rightarrow$ I, 11a-dehalogenation.

The present invention also embraces the compounds of structures IV and V, which are new compounds. These compounds are herein referred to as 11a-halo-6-deoxy-6-demethyl-6-methylene-5-oxytetracyclines.

The 11a-halogenation reaction is accomplished by merely contacting 5-oxytetracycline with a halogenating agent in a reaction inert solvent. For the production of the 11a-halo-5-oxytetracycline-6,12-hemiketals in which the halogen is chlorine a variety of halogenating agents may be used including chlorine, N-chloro lower alkanoic acid amides, e.g. N-chloroacetamide, hydrocarbon dicarboxylic acid imides, e.g. N-chlorosuccinimide, phthalimide and the like and N-lower-alkanoylanilides, e.g. N-chloroacetanilide, propionanilide and the like; 3-chloro and 3,5-dichloro, 5,5-dimethylhydrantoin, pyridinium perchloride hydrohalides, e.g. pyridinium perchloride hydrochloride, and lower alkyl hypochlorites, e.g. 3° butylhypochloride. It is obvious that, in general, any chlorinating agent commonly employed in the art is operable, but the above are preferred.

By "reaction-inert solvents" as employed herein is meant a solvent which under the conditions of the reaction, does not react in an undesired manner with either starting compounds or final products. A minimum of laboratory experimentation will permit the selection of suitable solvents for the present process. Exemplary of such solvents are dioxane, tetrahydrofuran, acetone, dimethyl ether of diethylene glycol (diglyme) and the dimethyl ether of ethylene glycol (monoglyme). Temperature does not appear to be critical in this process, temperatures of from −25° to 50° C. being found suitable with from −15° to 25° C. being preferred. Temperature above 50° C. should preferably be avoided due to the possible formation of degradation compounds which reduces the efficiency of the process. The selection of the best reaction conditions, e.g. temperature, solvent, chlorinating agent, etc., is a matter of routine experimentation.

The 11a-chloro hemiketals are preferably prepared using a water-miscible solvent system and the product obtained by water dilution of the reaction mixture. The 11a-chloro compounds are relatively stable in acidic aqueous solutions.

The preparation of 11a-fluoro-5-oxytetracycline hemiketals is accomplished by contacting oxytetracycline with perchloryl fluoride in the presence of a base, preferably an alkali metal hydroxide or alkoxide. The reaction is usually carried out by dissolving the starting compound in the selected solvent containing at least a molar equivalent of the base and adding perchloryl fluoride, a gas at room temperature, in the usual fashion. As the reaction proceeds, the pH of the solution drops from alkaline to near neutral values, the product usually commencing to separate at a pH of approximately 8. The crystalline product is collected in the usual fashion and dried.

The preparation of the 11a-halo-6-methylene-5-oxytetracyclines may be accomplished by treating the starting compound (III) with a strong acid of the dehydrating type such as sulfuric, trifluoroacetic, polyphosphoric, perchloric, hydrogen fluoride, and the like. Of these, the preferred is liquid hydrogen fluoride. Optimum reaction conditions are readily determined by routine experimentation. Generally, the starting compound is merely added to the selected acid and allowed to react. For example, the starting compound is added to liquid hydrogen fluoride at 0° to 50° C. and allowed to stand for time periods of up to several hours after which the hydrogen fluoride is allowed to evaporate.

After the reaction is complete, the product is obtained by standard procedures. For example, it is most convenient to merely dilute the reaction mixture with a nonsolvent, e.g. ether and the like, which results in precipitation of the product as the salt corresponding to the acid used. The products may be converted to the free base or any desired salt in the usual manner.

The direct halogenation is accomplished by merely contacting the starting 11a-halo compound with a halogenating agent in a reaction inert solvent. A number of halogenating agents may be used for this purpose including those enumerated hereinbefore as well as corresponding bromo or iodo compounds such as N-iodosuccinimide, N-bromosuccinimide and the like. It is usually preferred to use an equimolar amount of halogenating agent, i.e. brominating, chlorinating or iodinating agent, although excess amounts up to about 20 mole percent may also be employed. The time of reaction will vary with the starting compound and the selected halogenating agent. Generally, the reaction is allowed to proceed until a negative starch-iodide test is obtained. Reaction temperature ranging from −40° up to about 60° C. may be used although it is usually preferred to employ temperatures ranging between −20 and 40° C. which are found to give best results. When the reaction is complete the product is obtained by any of the standard methods of isolation which include, for example, precipitation of the 7,11a-dihalo compound by concentration of the reaction mixture or by dilution with a nonsolvent, e.g. ether, hexane. The product as obtained may be further purified or utilized in crude form for the 11a-dehalogenation reaction hereinafter described.

The 11a-dehalogenation is accomplished by either chemical or catalytic reduction using procedures well known to those in the art. Catalytic reduction, which is especially suited for reduction of the present 11a-chloro compounds may be accomplished in a solvent for the starting compound in the presence of a noble metal catalyst and pressures of hydrogen gas ranging from atmospheric to superatmospheric. Temperature does not appear to be critical in the catalytic hydrogenation. Temperatures of from 0° to about 50° C., and usually room temperature, are preferred since they generally give best results. The noble metal catalyst, e.g. palladium and, preferably, rhodium, are advantageously employed on a support such as carbon, in which form they are commonly available. The hydrogenation is carried out until the desired amount of hydrogen gas is absorbed at which point the hydrogenation is stopped. Of course, if it is desired to remove only 11a-halogen, an equimolar amount of hydrogen is required. Care should be taken to avoid prolonged excesses of reaction time beyond this point since the present new compounds are susceptible to further hydrogenation, e.g. removal of the 7-halogen atom, particularly when palladium is used as catalyst. The solvent selected for the hydrogenation should, of course, be reaction-inert, that is, it should not be capable of reaction with the starting compound, product or hydrogen under the conditions of the reaction. A variety of organic solvents may be used for this purpose. Minimum laboratory experimentation will permit the selection of a suitable solvent for any specific starting compound. Generally, lower alkanols, e.g. methanol, ethanol, are found most suitable although a variety of other solvents may be used.

A variety of chemical reducing agents may be used for the present 11a-dehalogenation reaction. These include reduction with active metals in mineral acids, e.g. zinc or iron in dilute hydrochloric acid; reduction with alkali metal hydrosulfite, preferably sodium hydrosulfite which is commercially available, in aqueous media; and, reaction with sodium iodide in a halogen-acceptor solvent such as acetone or methanol preferably in the presence of zinc metal. Of these, reduction with zinc and mineral acids is preferred, particularly with 11a-fluoro starting compounds. When aqueous systems are used in the aforementioned chemical reactions, it is, at times desirable to utilize a water-miscible solvent particularly when the starting compound is of limited solubility in the reaction mixture. The water-miscible solvent does not alter the course of the reduction but merely provides for more efficient reduction, e.g. shorter reaction time by providing more intimate contact of the reagents. A large number of such solvents are available for this purpose and include, among others, dimethylformamide, dimethoxyethane, methanol, ethanol, acetone, dioxane, tetrahydrofuran and the like.

The product is obtained from the 11a-dehalogenation reaction mixtures by standard procedures. For example, the present new compound is isolated from the catalytic hydrogenation reaction mixtures, after filtration of the catalyst, by precipitation, e.g. with a non-solvent such as ether or hexane, or concentration, usually under reduced pressure or a combination of these. Work-up of the chemical reduction mixtures to obtain the reduction product may also be accomplished by known procedures such as precipitation, concentration, solvent extraction, e.g. with alcohols such as the butanols and pentanols, or combinations of these procedures.

The reduction products after isolation, may be purified by any of the generally known methods for purification of tetracycline compounds. These include recrystallization from various solvents and mixed solvent systems, chromatographic techniques and countercurrent distribution, all of which are usually employed for this purpose.

The following table summarizes the in vitro activity of representative compounds of the present new compounds against a variety of disease-causing microorganisms. The minimum inhibitory concentration (MIC) is determined by the well known serial dilution technique.

(1) 6-deoxy - 6 - demethyl - 6 - methylene - 5 - oxytetracycline (2) 7 - chloro - 6 - deoxy - 6 - demethyl - 6 - methylene-5-oxytetracycline

TABLE I

| Organism | MIC (mcg./ml.) | |
| --- | --- | --- |
|  | 1 | 2 |
| Micrococcus pyogenes var. aureus 5 | 0.78 | 0.25 |
| Streptococcus pyogenes | 0.78 | 0.03 |
| Streptococcus faecalis | 0.39 | 0.6 |
| Diplococcus pneumoniae | 0.39 | 0.06 |
| Erysipelothrix rhusiopathiae | 0.39 | 0.125 |
| Corynebacterium diphtheriae | 3.12 | 1.0 |
| Listeria monocytogenes | 0.19 | 0.19 |
| Bacillus subtilis | 0.09 | 0.01 |
| Lactobacillus casei | 0.78 | ---------- |
| Bacterium ammoniagenes | 0.39 | 0.19 |
| Streptococcus pyogenes 98 | 0.09 | 0.01 |
| Micrococcus pyogenes var. aureus 209p | 0.25 | 0.25 |
| Aerobacter aerogenes | 6.3 | 1.56 |
| Escherichia coli | 3.12 | 0.78 |
| Pseudomonas aeruginosa | 100 | 3.12 |
| Salmonella gallinarum | 12.5 | 1.56 |
| Salmonella pullorum | p 3.15 | 0.78 |
| Klebsiella pneumoniae | p 3.15 | 0.78 |
| Neisseri gonorrhoeae | 0.19 | 0.06 |
| Hemophilus influenzae | 0.19 | 0.03 |
| Shigella sonnei | 3.12 | 0.39 |
| Brucella bronchiseptica | 0.39 | 0.25 |
| Malleomyces mallei | 1.56 | 0.25 |
| Vibrio comma | 0.78 | 3.12 |
| Pasteurella multocida | 0.19 | 0.5 |
| Sarcina lutea | 0.78 | ---------- |
| Streptococcus agalactiae | 0.39 | ---------- |
| Antibiotic resistant strains of Micrococcus pyogenes var. aureus: | | |
| 376 | 100 | 100 |
| 400 | 50 | 100 | p = partial inhibition.

When these in vitro tests were repeated in the presence of human serum, similar results were observed. The following table summarizes the activity of the aforementioned compounds when tested in 20% human serum:

TABLE II

| | MIC (mcg./ml.) | |
| --- | --- | --- |
|  | 1 | 2 |
| Micrococcus pyogenes var. aureus 5 | 0.78 | 0.39 |
| Streptococcus pyogenes | 0.78 | 0.09 |
| Streptococcus pyogenes 98 | ---------- | 0.19 |
| Micrococcus pyogenes var. aureus 209p | ---------- | 0.39 |

It is noted that 7-chloro-6-deoxy-6-demthyl-6-methylene-5-oxytetracycline has greater in vitro activity against a large number of organisms than 6-deoxy-6-demethyl-6-methylene-5-oxytetracycline.

When 6-deoxy-6-demthyl-6-methylene-5-oxytetracycline was tested in vivo through both the oral and parenteral route, it showed activity greater than tetracycline or 5-oxytetracycline against infection produced with tetracycline-sensitive microorganisms. The $PD_{50}$ (PD=protective dose) for the present new compound against an infection produced with Micrococcus pyogenes var. aureus 5 is 3.2 mg./kg. (orally) and 0.34 mg./kg. (parenterally). The corresponding $PD_{50}$ for tetracycline is 6.4 mg./kg. (orally) and 0.78 mg./kg. (parenterally).

The present new 6-methylene compounds (I) may be formulated into various compositions analogous to the parent tetracyclines from which they are derived. They are also useful therapeutically in feeds or as growth stimulants, in veterinary practice, and in agriculture.

For human therapy, the usual oral dosage of the present new compound is from about 0.1 to about 2 g. per day for the average adult. The product is formulated into capsules or tablets containing from 25 to 250 mg. of antibiotic on an activity basis. Suspensions or solutions in various vehicles are prepared using concentrations ranging from 5 to 125 mg./ml. For parenteral administration intramuscularly or intravenously, the daily dose is reduced to about .05 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. These products may also be used for topical applications in the usual extending media. In all instances, of course, the attending physician will indicate the dosage to fit the needs of a particular patient. For children, smaller doses are generally used.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically unacceptable acid addition salts, while not useful for therapy, are valuable for isolation and purification of the newly recognized antibiotic. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new antibiotic.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20 i.e. magnesium and calcium, and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e. barium and strontium, which are useful for isolation and purifying the antibiotic. Since the new antibiotic is amphoteric, it also forms salts with amines of sufficient basicity.

It will be obvious that, in addition to their value in therapy, the pharmaceutically acceptable acid and metal salts are also useful in isolation and purification.

This application is a continuation-in-part of copending application Serial Number 38,414 filed June 29, 1960 as well as copending application Serial Number 31,236 filed May 23, 1960.

The following examples are given by way of illustration and are not to be construed as limitations of this invention, many variations of which are possible within the scope and spirit thereof.

EXAMPLE I

*11a-chloro-6-deoxy-6-demethyl-6-methylene-5-oxytetracycline*

Five grams of 11a-chloro-5-oxytetracycline-6,12-hemiketal is added to 15 ml. of dry, liquid hydrogen fluoride, and the mixture is stirred for 3.5 hours at ice-bath temperature. The hydrogen fluoride is evaporated off by warming under a flow of nitrogen gas to obtain the product as the hydrofluoride salt.

The crude hydrofluoride product is dissolved in water and conc. HCl or perchloric acid (70%) is added dropwise to precipitate the hydrochloride or perchlorate salts respectively. The hydriodide salt is precipitated from acetone solution of the crude hydrofluoride salt by addition of 47% hydriodic acid.

Alternatively, the original reaction mixture is diluted with 6–7 volumes of water and ice and perchloric acid naphthalene sulfonic acid (concentrated acid) is added to precipitate the respective salt. Dilution with acetone of the original reaction mixture followed by addition of HI, precipitates the hydriodide salt.

The hydriodide salt, on elemental analysis, shows the following values: Calcd. for: $C_{22}H_{21}N_2O_8ClHI$: C, 43.7; H, 3.7; N, 4.6; Cl, 5.8. Found: C, 44.0; H, 4.0; N, 4.2; Cl, 5.5.

Ultraviolet analysis shows the following maxima: 222, 270 and 372 m$\mu$. Infrared analysis shows principal peaks at 3.05, 3.2, 5.7, 6.02, 6.03, 6.22, 6.4, 6.88, 7.4, 7.8, 8.1, 8.9 and 9.1 microns. The perchlorate salt on ultraviolet analysis shows maxima at 237, 270, and 372 m$\mu$.

11a-fluoro-6-deoxy-6-demethyl-6-methylene-5-oxytetracycline is prepared in the same manner using 11a-fluoro-5-oxytetracycline-6,12-hemiketal as the starting compound.

EXAMPLE II

*6-deoxy-6-demethyl-6-methylene-5-oxytetracycline*

Method A.—To a solution of 5 g. of the Example I product (as the hydriodide) in 125 ml. of dilute hydrochloric acid (part con. HCl in 55 parts of water) at 20° C. is added 2 g. of zinc dust. After stirring for 10 minutes, the zinc is filtered off, the filtrate adjusted to pH−0.8 and extracted with butanol. The butanol extract is concentrated under reduced pressure to a residue which is triturated with ether. The ether-insoluble residue is crystallized from methanol-acetone-conc.HCl-ether to obtain the product ts the hydrochloride-monomethanolate (2.5 g.) melting at 205° C. with decomposition.

Ultraviolet analysis in 0.01 N HCl in methanol shows $\lambda_{max}$ 252 m$\mu$, $E_{1\,cm.}^{1\%}$, 450 and $\lambda_{max}$ 345 m$\mu$, $E_{1\,cm.}^{1\%}$, 302; in 0.01 N NaOH in methanol, $\lambda_{max}$ 235 m$\mu$, $E_{1\,cm.}^{1\%}$, 442; $\lambda_{max}$ 254 m$\mu$, $E_{1\,cm.}^{1\%}$, 408; $\lambda_{max}$ 385 m$\mu$, $E_{1\,cm.}^{1\%}$, 329; $\lambda_{inf}$ 280 m$\mu$, $E_{1\,cm.}^{1\%}$, 329; in 0.01 N MgCl$_2$ in methanol, $\lambda_{max}$ 240 m$\mu$, $E_{1\,cm.}^{1\%}$, 461; $\lambda_{max}$ 277 m$\mu$, $E_{1\,cm.}^{1\%}$, 326; $\lambda_{max}$ 351 m$\mu$, $E_{1\,cm.}^{1\%}$, 282.

Infrared analysis shows principal peaks at 6.03, 6.2, 6.37 and 6.87 microns. Bioassay shows a value of 2000 to 2400 mcg./mg. (K. pneumoniae turbimetric assay with oxytetracycline as standard). Elemental analysis of the product gives the following values: C, 55.0; H, 5.2; N, 5.5; Cl, 7.0; OCH$_3$, 3.4. The product shows Rf values of 0 and 0.35 respectively in the following systems:

| Mobile Phase | Immobile Phase |
| --- | --- |
| (1) 2P:3 toluene-pyridine saturated with pH 4.2 buffer. | pH 4.2 buffer (aqueous). |
| (2) 20:10:3 nitromethane, chloroform pyridine saturated with pH 3.5 buffer. | pH 3.5 buffer (aqueous). |

*Method B.*—A mixture of 1 g. of the Example I 11a-chloro product in 10 ml. of methanol containing 200 mg. of 5% rhodium on carbon is hydrogenated at room temperature and 1 atmosphere of hydrogen gas until an equimolar amount of hydrogen is taken up (2-hours). The catalyst is filtered, the filtrate evaporated to dryness and the residue crystallized as in Method A.

*Method C.*—A mixture of 1 g. of the Example I 11a-chloro product in 70 ml. of water containing 1 g. of sodium hydrosulfite is stirred for 0.5 hours at room temperature. The mixture is then extracted with butanol and the butanol extract evaporated to dryness. The product is crystallized from the residue as in Method A.

*Method D.*—Using the procedure of Method A, 11a-fluoro-6-deoxy-6-demethyl-6-methylene-5-oxytetracycline perchlorate salt is reduced to 6-deoxy-6-demethyl-6-methylene-5-oxytetracycline.

The crystalline hydrochloride-methanolate product of this example may be recrystallized from isopropanol as 6-deoxy-6-demethyl-6-methylene-5-oxytetracycline hydrochloride. The recrystallized material shows the following peaks on infrared analysis: 3.1, 3.75, 6.02, 6.23, 6.36, 6.55, 6.9, 7.35, 7.6, 7.8, 8.15, 8.26, 8.5, 9.27, 9.95, 10.55, 10.8, 11.53, 11.93 and 12.15 microns.

EXAMPLE III

*7,11a-dichloro-6-deoxy-6-demethyl-6-methylene-5-hydroxytetracycline*

*Method A.*—To 5 g. of 11a-chloro-6-deoxy-6-demethyl-6-methylene-5-oxytetracycline hydriodide in 15 ml. of liquid hydrogen fluoride cooled at ice bath temperature, is added 1.5 g. of N-chlorosuccinimide. The solution is stirred at ice bath temperature for 1.5 hours. The crude product is precipitated by the addition of 500 ml. of ether and recovered by filtration.

The crude product is taken up in methanol at room temperature, the insoluble material is filtered, the filtrate treated with activated carbon, filtered and concentrated under reduced pressure. The resulting residue is taken up in dil. hydrochloric acid from which the product, as the hydrochloride, crystallizes.

Ultraviolet analysis in 0.01 N HCl in methanol shows $\lambda_{max}$ 239 m$\mu$, $E_{1\,cm.}^{1\%}$ 352 $\lambda_{max}$ 378 m$\mu$, $E_{1\,cm.}^{1\%}$ 60; $\lambda$ inflection 258 m$\mu$, $E_{1\,cm.}^{1\%}$—324.

Infrared analysis shows principal bands at 5.7, 6.0 and 6.9 microns.

*Method B.*—Five grams of 11a-chloro-5-oxytetracycline-6,12-hemiketal is added to 15 ml. of liquid hydrogen fluoride at ice-bath temperature. After stirring for 3.5 hours at ice-bath temperature, the procedure of Method A is then followed after addition of the same weight of N-chlorosuccinimide to obtain the product.

An alternative and somewhat more convenient method of work up is as follows. After the removal of most of the liquid hydrogen fluoride, 100 ml. of water is added and then 5 g. of $\beta$-naphthalenesulfonic acid is added. The product precipitates as the $\beta$-naphthalenesulfonic acid salt and is collected by filtration.

A further method of work-up involves dilution of the original reaction mixture with 6–7 volumes of water and is followed by dropwise addition of concentrated acid to precipitate the perchlorate and $\beta$-naphthalene sulfonate salts as described in Example I. The crude perchlorate salt so obtained is crystallized as long needles from isopropanol, which on ultraviolet analysis shows maxima at 260 and 377 m$\mu$ and an inflection at 260 m$\mu$. Infrared analysis shows peaks at 5.7, 6.0, 6.26, 6.55, 6.88, 7.2, 7.85 and 8.35 microns.

EXAMPLE IV

*7-chloro-6-deoxy-6-demethyl-6-methylene-5-oxytetracycline*

*Method A.*—To a solution of 0.5 g. of the 7,11a-dichloro-6-deoxy-6-demethyl-6-methylene-5-oxytetracycline perchlorate in 7.5 ml. of water is added 0.45 g. of sodium hydrosulfite and the resulting mixture stirred for 12 minutes. The product separates and is collected by filtration. Bioassay of the product gives a value of 3400 mcg./mg. [K. pneumoniae turbimetric assay with oxytetracycline (1000 mcg./mg.) as the standard.]

*Method B.*—Twenty grams of the $\beta$-naphthalene sulfonate salt of the previous example is suspended in 500 ml. of methanol containing 5 g. of 5% rhodium on carbon and the mixture hydrogenated at room temperature and 1 atmosphere of hydrogen gas. After the uptake of 700 ml. of hydrogen, the reaction is filtered and the filtrate evaporated to dryness to obtain 15.4 g. of residue.

A methanolic solution of 11 g. of the residue is then adjusted to pH—6.5 with triethylamine and passed onto an 8 x 100 cm. column containing 2 kg. of cellulose powder using water as stationary phase. The column is eluted with ethyl acetate saturated with water and 45 ml. fractions are collected. The elution pattern is followed by paper chromatography and fractions 132 to 260 are pooled, evaporated to dryness, slurried in ether and filtered to give 2.74 g. of pure amorphous amphoteric product.

The product is crystallized by dissolving 1.6 g. in 40 ml. of warm methanol and scratching. Filtration gives 890 mg. of the product as the amphoteric base. Infrared analysis shows the following peaks: 2.96, 3.29, 3.42, 6.06, 6.18, 6.30, 6.58, 6.88, 7.19, 7.48, 7.70, 8.23, 9.06, 9.88, 10.63, 10.92, 11.55 and 11.76 microns. Ultraviolet analysis shows the following: in 0.01 N HCl in methanol, maxima at 247 m$\mu$(log $\epsilon$ 4.28) and 346 m$\mu$(log $\epsilon$ 4.02) and an inflection at 370 m$\mu$(log $\epsilon$ 3.98); in 0.01 N NaOH in methanol, maxima at 234 m$\mu$(log $\epsilon$ 4.24), 253 m$\mu$(log $\epsilon$ 4.22) and 389 m$\mu$(log $\epsilon$ 4.12) and an inflection at 284 m$\mu$(log $\epsilon$ 4.07); in 0.01 M MgCl$_2$ in methanol, maxima at 241 m$\mu$(log $\epsilon$ 4.32); 349 m$\mu$(log $\epsilon$ 4.04); and 372 m$\mu$ (shoulder) (log $\epsilon$ 4.02).

The product shows the following Rf values in the indicated solvent systems:

| Rf Value | Solvent System | |
| --- | --- | --- |
| | Mobile Phase | Immobile Phase |
| 0.35 | ethyl acetate saturated with water. | aqueous phosphate buffer (pH—3). |
| 0.33 | ethyl acetate saturated with water. | McIlvaines buffer, pH 4.2. |

Bioassay (K. pneumoniae-oxytetracycline standard) gives a value of 6000 mcg./mg.

The crystalline perchlorate salt of the product of the preceding example is hydrogenated to give this product which is crystallized from methanol and 70% perchloric acid. The perchlorate salt of the product shows identical ultraviolet spectra to that of the amphoteric base.

*Method C.*—This product is also obtained by reduction of the starting compound of Method A with zinc and acid according to the procedure of Example II.

EXAMPLE V

*7-bromo-11a-chloro-6-deoxy-6-demethyl-6-methylene-5-oxytetracycline*

This product is prepared according to the procedures of Methods A and B of Example III using an equivalent amount of N-bromosuccinimide in place of N-chlorosuccinimide.

EXAMPLE VI

*7-bromo-6-deoxy-6-demethyl-6-methylene-5-oxytetracycline*

This product is obtained from the Example V product by the sodium hydrosulfite treatment described in Example IV.

The following compounds are prepared from the corresponding 11a-halo compounds by the procedures of the previous examples: 7-chloro - 11a - fluoro-6-deoxy-6-demethyl-6-methylene-5-oxytetracycline, 7-iodo-11a-chloro-6-deoxy - 6 - demethyl - 6 - methylene-5-oxytetracycline, 7 - bromo-11a-fluoro - 6 - deoxy-6-demethyl-6-methylene-5-oxytetracycline.

These compounds are converted to the corresponding 11a-deshalo compounds by the aforementioned procedures.

EXAMPLE VII

*Acid addition salts*

Amphoteric 6-deoxy-6-demethyl - 6 - methylene-5-oxytetracycline is dissolved in methanol containing an equimolar amount of hydrogen chloride. The hydrochloride salt is then precipitated by addition of ether, and is collected by filtration and dried. The hydrochloride may be recrystallized from butano, butanol-hydrochloric acid, acetone, acetone-hydrochloric acid or methanol-hydrochloric acid.

In the same manner, acid addition salts of 7-chloro-6-deoxy-6-demethyl - 6 - methylene-5-oxytetracycline are prepared using, in lieu of hydrochloric acid, sulfuric, nitric, perchloric, hydrobromic, phosphoric, hydrofluoric, p-toluenesulfonic, hydriodic, tartaric, acetic, citric, malic, benzoic, glycollic, gulonic, gluconic, succinic, sulfosalicyclic acids.

EXAMPLE VIII

*Metal salts*

The sodium salt of 6-deoxy-6-demethyl-6-methylene-5-oxytetracycline is prepared by dissolving the amphoteric substance in water containing an equimolar amount of sodium hydroxide and freeze drying the resulting mixture.

In this fashion, other metal salts are prepared including potassium, calcium, barium, lithium and strontium salts.

The metal salt complexes of the present new tetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol soluble, by evaporation of the solvent or addition of a non-solvent such as diethyl ether.

In this fashion, metal salt complexes of the present new tetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate stannous bromide, zinc sulfate, chromous chloride and nickellous chloride.

EXAMPLE IX

A suspension of 6-demethyl-6-methylene-5-oxytetracycline is prepared with the following composition:

| | |
|---|---|
| Antibiotic _____ g__ | 31.42 |
| 70% aqueous sorbitol _____ g__ | 714.29 |
| Glycerine U.S.P. _____ g__ | 185.35 |
| Gum acacia (10% solution) _____ ml__ | 100 |
| Polyvinyl pyrrolidone _____ g__ | 0.5 |
| Butyl parahydroxybenzoate (preservative) __g__ | 0.172 |
| Propyl parahydroxybenzoate (preservative) _g__ | 0.094 |
| Water, distilled to make 1 liter. | |

To this suspension, various sweetening and flavoring agents, as well as acceptable colors, may be added by choice. The suspension contains approximately 25 mg. of antibiotic activity per milliliter.

EXAMPLE X

A solution of 6-demethyl-6-methylene-5-oxytetracycline is prepared with the following compositions:

| | |
|---|---|
| Antibiotic _____ g__ | 30.22 |
| Magnesium chloride hexahydrate _____ g__ | 12.36 |
| Monoethanolamine _____ ml__ | 8.85 |
| Propylene glycol _____ g__ | 376 |
| Water _____ ml__ | 94 |

The solution has a concentration of 50 mg./ml. and is suitable for parenteral and especially for intramuscular administration.

EXAMPLE XI

A tablet base is prepared by blending the following ingredients in the proportion by weight indicated:

| | |
|---|---|
| Sucrose U.S.P. _____ | 80.3 |
| Tapioca starch _____ | 13.2 |
| Magnesium stearate _____ | 6.5 |

Into this base there is blended sufficient 6-deoxy-6-demethyl-6-methylene-5-oxytetracycline to provide tablets containing 25, 100 and 250 mg. of active ingredient.

EXAMPLE XII

A blend is prepared containing the following ingredients:

| | |
|---|---|
| Calcium carbonate U.S.P. _____ | 17.6 |
| Dicalcium phosphate _____ | 18.8 |
| Magnesium trisilicate U.S.P. _____ | 5.2 |
| Lactone U.S.P. _____ | 5.2 |
| Potato starch _____ | 5.2 |
| Magnesium stearate A _____ | 0.8 |
| Magnesium stearate B _____ | 0.35 |

To this blend is added sufficient 6-deoxy-6-demethyl-6-methylene-5-oxytetracycline to provide capsules containing 25, 100 and 250 mg. of active ingredient.

EXAMPLE XIII

One thousand grams of 6-deoxy-6-demethyl-6-methylene-5-oxytetracycline are intimately mixed and ground with 2500 grams of sodium ascorbate. The ground, dry mixture is filled into vials, sterilized with ethylene oxide and the vials sterilely stoppered. For intravenous administration sufficient water is added to the vials to form a solution containing 10 mg. of active ingredient per milliliter.

EXAMPLE XIV

11a-fluoro-5-oxytetracycline-6,12-hemiketal

To a mixture of 6.9 g. of anhydrous oxytetracycline base dissolved in 285 ml. of methanol cooled in an ice bath is added 1 equivalent of 1 N sodium methoxide-methanol solution. The yellow sodium salt precipitates. Perchloryl fluoride is bubbled in and the sodium salt redissolves. As the mixture nears neutrality a heavy precipitate starts to form. The excess perchloryl fluoride is swept out with a stream of nitrogen, the product filtered off, washed with cold methanol and dried under vacuum at room temperature to obtain 5.1 g. of pale yellow crystals. Infrared absorption shows no carbonyl absorption below 6 microns. Bioassay against K. pneumoniae shows an activity of 4 mcg./mg. on the tetracycline scale. Ultraviolet absorption shows maxima at 265 and 336 m microns. Elemental analysis gives the following results after recrystallization of the product from water.

Calcd. for: $C_{22}H_{23}O_9N_2F \cdot 2H_2O$: C, 51.4; H, 5.25, N, 5.5. Found: C, 51.2; H, 5.3, N, 5.7.

EXAMPLE XV

11a-chloro-5-oxytetracycline-6,12-hemiketal

Twenty-three grams of anhydrous oxytetracycline is dissolved in 250 ml. of 1,2-dimethoxyethane and 8 g. of N-chlorosuccinimide is next added. The mixture is stirred for two minutes and then poured into 1 liter of stirred water. The product which separates is collected by filtration water-washed and dried. Infrared analysis of the product (KBr at 1% concentration) shows no carbonyl absorption in the 5-6 micron region but shows the following principal peaks: 6.12, 6.35, 6.66, 6.85, 7.22, 7.55, 7.75, 7.92, 8.14, 8.36, 8.78, 9.18, 9.43 microns. Bioassay of the product shows a tetracycline activity of 4 mcg./mg.

What is claimed is:

1. Compounds selected from the group consisting of compounds of the formula:

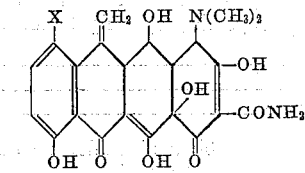

in which:

X is selected from the group consisting of hydrogen, chloro, iodo and bromo; and acid addition salts and pharmaceutically acceptable metal salts thereof.

2. 7-chloro-6-deoxy - 6 - demethyl-6-methylene-5-oxytetracycline.

3. 7-bromo-6-deoxy - 6 - demethyl-6-methylene-5-oxytetracycline.

4. 6 - deoxy-6-demethyl - 6 - methylene-5-oxytetracycline.

5. Compounds selected from the group consisting of compounds of the formula:

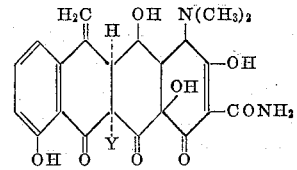

in which:

Y is selected from the group consisting of chloro and fluoro and acid addition salts thereof.

6. Compounds selected from the group consisting of compounds of the formula:

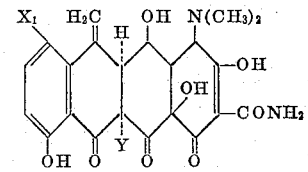

in which:

$X_1$ is selected from the group consisting of chloro, bromo and iodo; and Y is selected from the group consisting of fluoro and chloro; and acid addition salts thereof.

7. 11a - chloro-6-deoxy - 6 - demethyl-6-methylene-5-oxytetracycline.

8. 11a - fluoro-6-deoxy - 6 - demethyl-6-methylene-5-oxytetracycline.

9. 7,11a-dichloro - 6 - deoxy-6-demethyl-6-methylene-5-oxytetracycline.

10. 7-chloro-11a-fluoro - 6 - deoxy-6-demethyl-6-methylene-5-oxytetracycline.

11. 7-bromo-11a-fluoro - 6 - deoxy-6-demethyl-6-methylene-5-oxytetracycline.

12. 7 - bromo-11a-chloro-6-deoxy-6-demethyl-6-methylene-5-oxytetracycline.

No references cited.